United States Patent
Dunphy et al.

(10) Patent No.: US 9,423,564 B2
(45) Date of Patent: *Aug. 23, 2016

(54) OPTICAL WAVEGUIDE FEEDTHROUGH ASSEMBLY

(71) Applicant: WEATHERFORD/LAMB, INC., Houston, TX (US)

(72) Inventors: James R. Dunphy, South Glastonbury, CT (US); John J. Sgambelluri, Meriden, CT (US); John Grunbeck, Northford, CT (US); George Talmadge, Clinton, CT (US); Robert F. Robinson, Middletown, CT (US); James M. Sullivan, East Hampton, CT (US); Joseph F. Robbins, Monson, MA (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 258 days.

This patent is subject to a terminal disclaimer.

(21) Appl. No.: 13/795,323

(22) Filed: Mar. 12, 2013

(65) Prior Publication Data

US 2013/0223809 A1    Aug. 29, 2013

Related U.S. Application Data

(63) Continuation of application No. 11/172,616, filed on Jun. 30, 2005, now Pat. No. 8,422,835.

(51) Int. Cl.
*G02B 6/38* (2006.01)
*G02B 6/24* (2006.01)
(Continued)

(52) U.S. Cl.
CPC .............. *G02B 6/24* (2013.01); *E21B 47/123* (2013.01); *G01L 11/025* (2013.01); *G02B 6/4248* (2013.01); *G02B 6/4428* (2013.01)

(58) Field of Classification Search
CPC  G02B 6/0218;  G02B 6/022;  G02B 6/02385; G02B 6/10
See application file for complete search history.

(56) References Cited

U.S. PATENT DOCUMENTS 3,825,320 A   7/1974  Redfern
4,469,399 A   9/1984  Cowen
(Continued)

FOREIGN PATENT DOCUMENTS

EP   0316473 B1   11/1987
GB   2427911 B1   10/2007
GB   2443548 B2    7/2008

OTHER PUBLICATIONS

Office Action dated Jun. 26, 2013, issued by the Canadian Intellectual Property Office in corresponding Application No. 2,658,704.

(Continued)

*Primary Examiner* — Ryan Lepisto
*Assistant Examiner* — Mary El Shammaa
(74) *Attorney, Agent, or Firm* — Patterson & Sheridan, L.L.P.

(57) ABSTRACT

An optical waveguide feedthrough assembly passes at least one optical waveguide through a bulk head, a sensor wall, or other feedthrough member. The optical waveguide feedthrough assembly comprises a cane-based optical waveguide that forms a glass plug sealingly disposed in a feedthrough housing. For some embodiments, the optical waveguide includes a tapered surface biased against a seal seat formed in the housing. The feedthrough assembly can include an annular gold gasket member disposed between the tapered surface and the seal seat. The feedthrough assembly can further include a backup seal. The backup seal comprises an elastomeric annular member disposed between the glass plug and the housing. The backup seal may be energized by a fluid pressure in the housing. The feedthrough assembly is operable in high temperature and high pressure environments.

9 Claims, 9 Drawing Sheets

(51) Int. Cl.
*E21B 47/12* (2012.01)
*G01L 11/02* (2006.01)
*G02B 6/42* (2006.01)
*G02B 6/44* (2006.01)

(56) References Cited

U.S. PATENT DOCUMENTS

| | | | |
|---|---|---|---|
| 4,486,072 | A | 12/1984 | Roberts |
| 4,674,833 | A | 6/1987 | Des Forges |
| 4,679,895 | A | 7/1987 | Huber |
| 4,682,846 | A | 7/1987 | Cowen |
| 4,880,290 | A | 11/1989 | Kumazawa |
| 5,024,503 | A | 6/1991 | Gunn |
| 5,216,734 | A | 6/1993 | Grinderslev |
| 5,450,515 | A | 9/1995 | Bechtel |
| 5,627,343 | A | 5/1997 | Branedolf |
| 5,844,667 | A | 12/1998 | Maron |
| 5,888,098 | A * | 3/1999 | Cheng et al. ............ 439/620.28 |
| 5,943,460 | A | 8/1999 | Mead |
| 6,009,610 | A | 1/2000 | Brandolf |
| 6,042,591 | A | 3/2000 | Mears |
| 6,067,395 | A | 5/2000 | Cairns |
| 6,115,528 | A | 9/2000 | Schmucker |
| 6,216,939 | B1 | 4/2001 | Thackara |
| 6,321,021 | B1 | 11/2001 | Cairns |
| 6,439,055 | B1 | 8/2002 | Maron |
| 6,445,868 | B1 | 9/2002 | Grunbeck |
| 6,526,212 | B1 | 2/2003 | Mishriky |
| 6,633,720 | B1 | 10/2003 | Xu |
| 6,634,799 | B2 * | 10/2003 | Auld ............................... 385/76 |
| 6,768,825 | B2 | 7/2004 | Maron |
| 6,813,013 | B2 | 11/2004 | Fernald |
| 6,931,188 | B2 | 8/2005 | Kersey |
| 6,959,140 | B2 | 10/2005 | Cens |
| 7,267,260 | B2 | 9/2007 | Nasiri |
| 7,430,881 | B2 | 10/2008 | Bryant |
| 7,447,390 | B2 | 11/2008 | Dunphy |
| 8,070,369 | B2 | 12/2011 | Fernald |
| 2001/0022886 | A1 * | 9/2001 | Cairns et al. ................. 385/138 |
| 2002/0150375 | A1 | 10/2002 | Hung et al. |
| 2002/0181909 | A1 | 12/2002 | Grunbeck et al. |

OTHER PUBLICATIONS

Search Report dated Oct. 3, 2006, issued by the UK Intellectual Property Office in corresponding Application No. 0611022.5.
Examination Report dated Oct. 1, 2008, issued by the UK Intellectual Property Office in corresponding Application No. 0611022.5.
Search Report dated May 27, 2009, issued by the UK Intellectual Property Office in corresponding Application No. 0904486.8.
Examination Report dated Aug. 15, 2012, issued by the UK Intellectual Property Office in corresponding Application No. 0904486.8.

* cited by examiner

OPTICAL WAVEGUIDE FEEDTHROUGH ASSEMBLY

CROSS REFERENCE TO RELATED APPLICATIONS

This application is a continuation of U.S. application Ser. No. 11/172,616, filed Jun. 30, 2005, now U.S. Pat. No. 8,422,835, issued Apr. 16, 2013 and entitled "Optical Waveguide Feedthrough Assembly," which is related to U.S. application Ser. No. 11/172,617, now issued U.S. Pat. No. 7,447,390, filed Jun. 30, 2005 and entitled "Pressure Transducer with Optical Waveguide Feedthrough Assembly," both of which are herein incorporated by reference in their entirety.

BACKGROUND OF THE INVENTION

1. Field of the Invention

The present invention relates to feedthroughs for optical waveguides, and more particularly, to hermetically sealed feedthroughs suitable for use in high pressure, high temperature, and/or other harsh environments.

2. Description of the Related Art

In many industries and applications, there is a need to have small diameter wires or optical waveguides penetrate a wall, bulkhead, or other feedthrough member wherein a relatively high fluid or gas differential pressure exists across the feedthrough member. In addition, one or both sides of the feedthrough member may be subjected to relatively high temperatures and other harsh environmental conditions, such as corrosive or volatile gas, fluids and other materials.

In the case of electrical systems, these devices, called feedthroughs or penetrators, typically are constructed by using metal 'pins' exhibiting high conductivity and a low thermal coefficient of expansion. The pins are concentrically located within a hole in a housing, and the resulting annular space is filled with a suitable sealing glass or other material. Critical to the success of such seals is the selection of the metal housing, sealing glass, and electrical pin to ensure completion of a compression seal around the ductile inclusion (pin). As the operating temperature range of the feedthrough increases, the control of thermal expansion rates becomes increasingly important in order to avoid failure of the feedthrough by excessive thermal stress at the interface layers between the various materials. This technology is relatively mature for electrical feedthroughs, and commercial devices are readily available that meet service temperatures in excess of 200° C.

More recently, with the introduction of optical sensors, particularly sensors for use in oil and gas exploration and production and for life in harsh industrial environments, a need has emerged for a bulkhead feedthrough that can seal an optical fiber at high pressures of 20,000 psi and above, and high temperatures of 150° C. to 300° C., with a service life of 5 to 20 years. An exemplary sensing assembly for use in harsh environments is disclosed in U.S. Pat. No. 6,439,055, which issued on Aug. 27, 2002, entitled "Pressure Sensor Assembly Structure To Insulate A Pressure Sensing Device From Harsh Environments", which is assigned to the Assignee of the present application and is incorporated herein by reference in its entirety.

There are several problems associated with constructing such an optical fiber feedthrough. One of these problems is the susceptibility of the glass fiber to damage and breakage. This is due to the flexibility of the small size fiber, the brittle nature of the glass material, and the typical presence of a significant stress concentration at the point where the fiber enters and exits the feedthrough. Attempts to use a sealing glass, such as that used with electrical feedthroughs, have had problems of this nature due to the high stress concentration at the fiber-to-sealing glass interface.

Another problem with sealing an optical fiber, as opposed to sealing a conductive metal "pin" in an electrical feedthrough, is that the fused silica material of which the optical fiber is made, has an extremely low thermal expansion rate. Compared to most engineering materials, including metals, sealing glasses, as well as the metal pins typically used in electrical feedthroughs, the coefficient of thermal expansion of the optical fiber is essentially zero. This greatly increases the thermal stress problem at the glass-to-sealing material interface.

One technique used to produce optical fiber feedthroughs is the use of a sealed window with an input and an output lensing system. In this technique, the optical fiber must be terminated on each side of a pressure-sealed window, thus allowing the light to pass from the fiber into a lens, through the window, into another lens, and finally into the second fiber. The disadvantages associated with this system include the non-continuous fiber path, the need to provide two fiber terminations with mode matching optics, thus increasing manufacturing complexity and increasing the light attenuation associated with these features.

It is often desirable to mount fiber optic based sensors in harsh environments that are environmentally separated from other environments by physical bulkheads. An exemplary such fiber optic based sensor is disclosed in co-pending U.S. patent application Ser. No. 09/205,944, entitled "Tube-Encased Fiber Grating Pressure Sensor" to T. J. Bailey et al., which is assigned to the Assignee of the present invention and is incorporated herein by reference in its entirety. This exemplary optical sensor is encased within a tube and certain embodiments are disclosed wherein the sensor is suspended within a fluid. The sensor may be used in a harsh environment, such as where the sensor is subjected to substantial levels of pressure, temperature, shock and/or vibration. In certain environments, such sensors are subjected to continuous temperatures in the range of 150° C. to 250° C., shock levels in excess of 100 Gs, and vibration levels of 5G RMS at typical frequencies between about 10 Hz and 2000 Hz and pressures of about 15 kpsi or higher.

However, as discussed above, the harsh environments where the sensors are located generally must be isolated by sealed physical barriers from other proximate environments through which the optical fiber communication link of the sensor must pass. It is important to seal the bulkhead around the optical fiber to prevent adjacent environments in the sensor from contaminating the optical fiber communication link. If the optical communication fiber is compromised by contamination from an adjacent harsh sensor environment, the optical fiber and all sensors to which it is connected are likely to become ineffective.

There is a need therefore, for an optical waveguide feedthrough assembly capable of operating in relative high temperature and high pressure environments.

SUMMARY OF THE INVENTION

Embodiments of the present invention provide an optical waveguide feedthrough assembly, and a method of making such an assembly, which overcomes one or more of the above-described drawbacks and disadvantages of the prior art, and is capable of relatively long-lasting operation at relatively high pressures and/or temperatures.

An optical waveguide feedthrough assembly passes at least one optical waveguide through a bulk head, a sensor wall, or other feedthrough member. The optical waveguide feedthrough assembly comprises a cane-based optical waveguide that forms a glass plug sealingly disposed in a feedthrough housing. For some embodiments, the optical waveguide includes a tapered surface biased against a seal seat formed in the housing. The feedthrough assembly can include an annular gold gasket member disposed between the conical glass surface and the metal seal seat. The feedthrough assembly can further include a backup seal. The backup seal comprises an elastomeric annular member disposed between the glass plug and the housing. The backup seal may be energized by a fluid pressure in the housing. The feedthrough assembly is operable in high temperature and high pressure environments.

The conical taper of the glass waveguide surface is designed to be complementary to the bulkhead seal seat. The role of the gold gasket is to accommodate practical manufacturing tolerances on the surface finishes of the glass plug and the bulkhead seal seat. Furthermore, the role of the backup elastomeric seal is to accommodate practical manufacturing tolerances on the shape functions the glass plug and the bulkhead seal seat.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Epoxy-free optical fiber feedthrough assemblies applicable for use in high temperature, high pressure environments are provided. In one embodiment, a feedthrough assembly includes a glass plug disposed in a recess of a feedthrough housing. The glass plug is preferably a large-diameter, cane-based, waveguide adapted to seal the recess in the housing and provide optical communication through the housing. All embodiments described herein provide for sealing with respect to the housing at or around the glass plug of an optical waveguide element passing through the housing.

As used herein, "optical fiber," "glass plug" and the more general term "optical waveguide" refer to any of a number of different devices that are currently known or later become known for transmitting optical signals along a desired pathway. For example, each of these terms can refer to single mode, multi-mode, birefringent, polarization maintaining, polarizing, multi-core or multi-cladding optical waveguides, or flat or planar waveguides. The optical waveguides may be made of any glass, e.g., silica, phosphate glass, or other glasses, or made of glass and plastic, or solely plastic. For high temperature applications, optical waveguides made of a glass material is desirable. Furthermore, any of the optical waveguides can be partially or completely coated with a gettering agent and/or a blocking agent (such as gold) to provide a hydrogen barrier that protects the waveguide. In addition, the feedthrough assemblies can include a single such optical waveguide or may include a plurality of such optical waveguides.

An Exemplary Feedthrough Assembly

Figure 1:
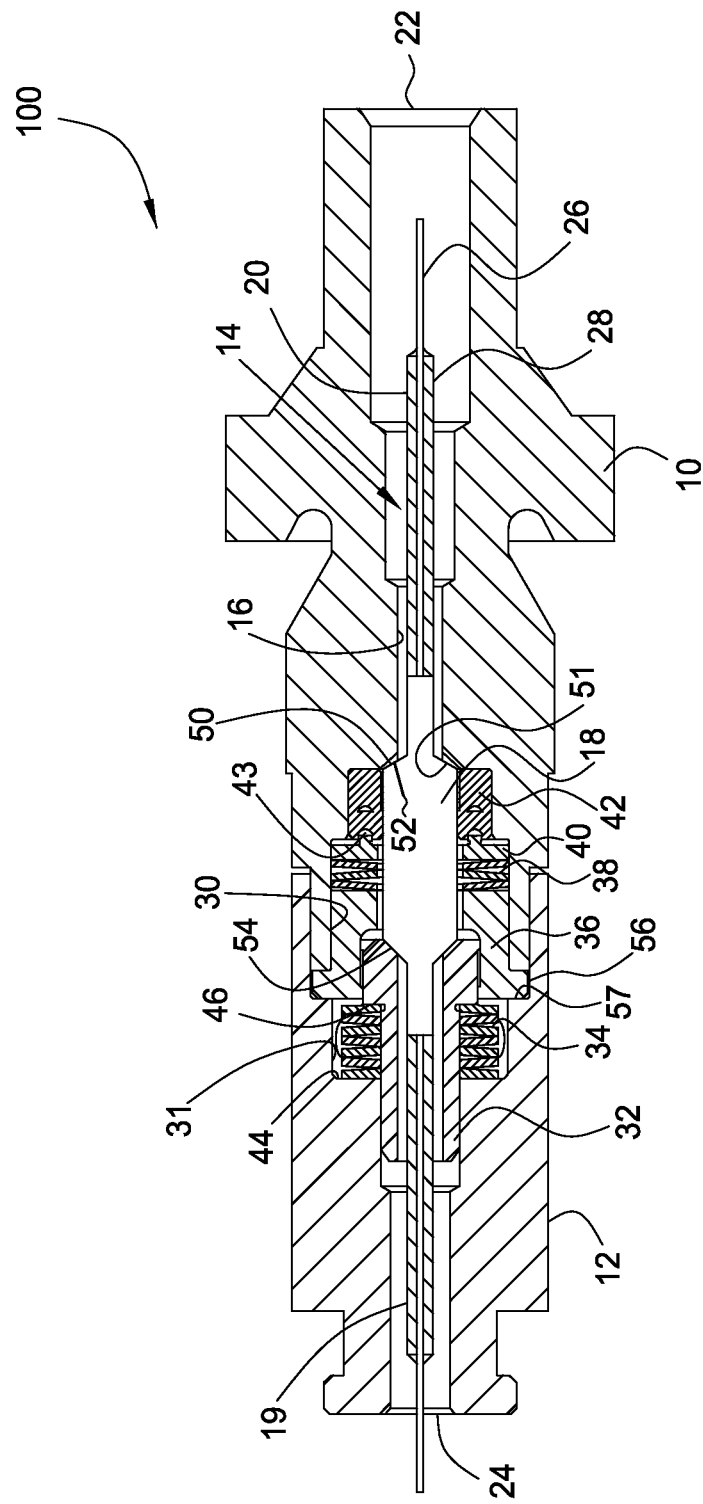
FIG. 1 illustrates a cross section view of an optical waveguide feedthrough assembly.

FIG. 1 shows a cross section view of an optical fiber feedthrough assembly 100 that includes a front housing 10 coupled to a back housing 12. An optical waveguide element 14 passes through a passageway 16 common to both housings 10, 12. The passageway 16 is defined by bores extending across the housings 10, 12. The optical waveguide element 14 includes a glass plug 18 defining a large-diameter, cane-based, optical waveguide preferably having an outer diameter of about 3 millimeters (mm) or greater. The glass plug 18 can have appropriate core and cladding dimensions and ratios to provide the desired outer large-diameter.

For some embodiments, first and second fiber pigtails 19, 20 extend from each end of the glass plug 18. Each of the pigtails 19, 20 preferably include an optical waveguide such as an optical fiber 26 encased or embedded in a carrier 28 or larger diameter glass structure allowing the fiber 26 to be optically coupled to the glass plug 18. U.S. patent application Ser. No. 10/755,722, entitled "Low-Loss Large-Diameter Pigtail" and hereby incorporated by reference in its entirety, describes exemplary pigtails that can facilitate subsequent optical connection of the fiber 26 to other fibers, connecters, or other optical components by suitable splicing techniques known in the art. Further, U.S. application Ser. No. 10/755,708, entitled "Large Diameter Optical Waveguide Splice," which is herein incorporated by reference in its entirety, describes a large-diameter splice suitable for splicing the fiber pigtails 19, 20 to the glass plug 18. For some embodiments, the glass plug 18 can be spliced to or otherwise optically coupled with fibers in optical communication with each end of the glass plug 18 by other techniques and methods.

Sealing of the optical waveguide element 14 with respect to the front housing 10 occurs at and/or around the glass plug 18 to enable isolation of fluid pressure in communication with a first end 22 of the passageway 16 from fluid pressure in communication with a second end 24 of the passageway 16. This sealing of the glass plug 18 with respect to the front housing 10 provides the feedthrough capabilities of the feedthrough assembly 100. In the embodiment shown in FIG. 1, the glass plug 18 has a cone shaped tapered surface 50 for seating against a complementary tapered seat 51 of the front housing 10. Engagement between the tapered surface 50 and the complementary tapered seat 51 that is located along the passageway 16 forms a seal that seals off fluid communication through the passageway 16. The glass plug 18 can be machined to provide the cone shaped tapered surface 50. Additionally, the glass plug 18 is preferably biased against the tapered seat 51 using a mechanical preload.

A recess 30 formed in one end of the front housing 10 aligns with a corresponding recess 31 in one end of the back housing 12 where the housings 10, 12 are coupled together. Preferably, the front housing 10 is welded to the back housing 12 along mated features thereof. The housings 10, 12 preferably enclose the glass plug 18, a biasing member such as a first stack of Belleville washers 34, and a plunger 32, which are all disposed within the recesses 30, 31.

The first stack of Belleville washers 34 supply the mechanical preload by pressing the plunger 32 onto an opposite end of the glass plug 18 from the tapered surface 50. Since the plunger 32 is moveable with the glass plug 18, this pressing of the plunger 32 develops a force to bias the glass plug 18 onto the tapered seat 51 of the front housing 10 located along the passageway 16 that passes through the front housing 10. Transfer of force from the plunger 32 to the glass plug 18 can occur directly via an interface 54 between the two, which can include mating conical surfaces. The first stack of Belleville washers 34 compress between a base shoulder 44 of the recess 31 in the back housing 12 and an outward shoulder 46 of the plunger 32 upon make-up of the front housing 10 to the back housing 12. Once the back housing 12 is welded or otherwise attached to the front housing 10 in order to keep the front and back housings 10, 12 connected, the first stack of Belleville washers 34 maintains the compression that supplies force acting against the plunger 32.

In some embodiments, the feed through assembly 100 further includes a gasket member 52 disposed between the tapered seat 51 and the tapered surface 50 of the glass plug 18. As shown in FIG. 1, the gasket member 52 comprises an annular gasket. The gasket member 52 may be a gold foil that is shaped to complement the tapered surface 50 and the tapered seat 51. The gasket member 52 deforms sufficiently to accommodate imperfections on the tapered surface 50 and/or the tapered seat 51, thereby completing the seal and reducing stress between contacting surfaces due to any imperfections on the surfaces. Gold is preferred because of its ability to withstand high temperature, its ductility and its inert, non-reactive, non-corrosive nature. However, other materials possessing these characteristics may also be suitable, including aluminum, lead, indium, polyetheretherketone ("PEEK™"), polyimide, other suitable polymers, and combinations thereof.

An additional gasket member (not shown) may be disposed between the interface 54 of the glass plug 18 and the plunger 32 for some embodiments to reduce the surface stress that may occur between these two components. In further embodiments, a layer of gold or other suitable material is deposited on the contact surfaces as an alternative to using the gasket member 52. For example, the gold may be deposited using chemical vapor deposition, physical vapor deposition, plating, or combinations thereof to reduce surface stress and maximize the seal performance. Other embodiments utilize the gasket member 52 punched from sheets of a gasket material.

For some embodiments, the housings 10, 12 additionally enclose a cup-shaped backstop sleeve 36, a second stack of Belleville washers 38, a perforated washer 40, and a centering element 42 that are all disposed within the recesses 30, 31. An outward shoulder 56 of the backstop sleeve 36 is trapped by the end of the front housing 10 and an inward shoulder 57 along the recess 31 in the back housing 12. Contact upon sandwiching of the shoulder 56 of the backstop sleeve 36 provides the point at which the housings 10, 12 are fully mated and can be secured together. Clearance is provided such that the end of the back housing 12 does not bottom out prior to the housings 10, 12 being fully mated.

The centering element 42 includes an elastomeric sealing component disposed between the glass plug 18 and the front housing 10 that can act as a back-up seal in addition to facilitating alignment of the glass plug 18 with respect to the seat 51. Although the centering element 42 is described as providing a back up seal to the tapered surface 50 of the glass plug 18 seated with the gasket member 52 on the complementary tapered seat 51, the centering element 42 can be omitted or used independently to seal off the passageway 16 through the housings 10, 12 in other embodiments.

In some applications, the pressure in the recesses 30, 31 entering from the second end 24 of the passageway 16 is higher than the pressure entering from the first end 22 of the passageway 16. This pressure differential advantageously causes the centering element 42 to deform and press against the wall of the recess 30 and the wall of the glass plug 18, thereby creating a pressure energized seal. In some embodiments, one or more holes or annular channels 43 are formed on the outer surface of the high pressure side of the centering element 42. These holes or channels 43 facilitate the deformation of the centering element 42 and the formation of the seal between the centering element 42 and the walls of the recess 30 and the glass plug 18. Additionally, the perforated washer 40 enables pressurized fluid to fill the centering element 42 for providing the energized seal.

Preferably, force transferred through the perforated washer 40 biases the centering element 42 into the recess 30. The second stack of Belleville washers 38 pressed by the backstop sleeve 36 supplies the preloading force to the perforated washer 40. The second stack of Belleville washers 38 allow a maximum pressure force to act on the centering element 42 such that pressure of the centering element 42 against the wall of the glass plug 18 does not override force being put on the glass plug 18 to press the tapered surface 50 against the seat 51.

Embodiments of the feedthrough assembly 100 are capable of performing in temperature environments of between −50° C. and 300° C. Additionally, the feedthrough assembly 100 is capable of withstanding pressure up to about 30 kpsi.

Embedding Diagnostic Sensors

Figure 2:
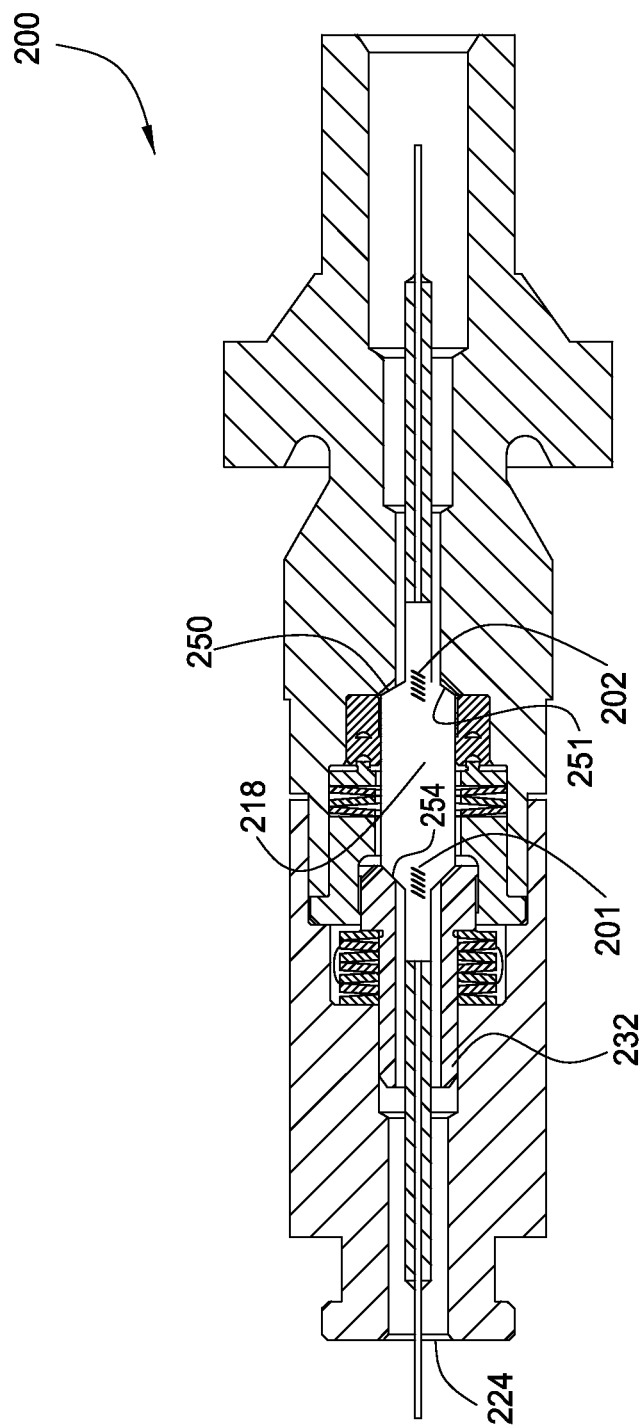
FIG. 2 illustrates a cross section view of an optical waveguide feedthrough assembly having diagnostic sensors disposed therein.

FIG. 2 illustrates a cross section view of an optical waveguide feedthrough assembly 200 that operates similar to the feedthrough assembly 100 shown in FIG. 1. However, the feedthrough assembly 200 includes first and second diagnostic sensors 201, 202 disposed within a glass plug 218. The diagnostic sensors 201, 202 can include any optical sensing element, such as fiber Bragg gratings, capable of reflecting or transmitting an optical signal in response to a parameter being measured. The first diagnostic sensor 201 is disposed within the glass plug 218 proximate an interface 254 where a plunger 232 pushes on the glass plug 218. The second diagnostic sensor 202 is disposed within the glass plug 218 proximate where a tapered surface 250 of the glass plug 218 mates with a seat 251. Preferably, each of the diagnostic sensors 201, 202 span a length of the glass plug 218 across the respective feature that the sensor is proximate.

Interpreting the signals generated by the sensors 201, 202, such as by use of a suitable algorithm or comparison to a calibration, enables monitoring of temperature and/or pressure. This detection ability allows real-time monitoring of the state of the feedthrough assembly 200. Information derived from the sensors 201, 202 can be beneficial both during fabrication of the feedthrough assembly 200 and during use thereof. For diagnostic purposes, signals received from the second sensor 202 can be monitored to identify when and/or if proper contact of the tapered surface 250 with the seat 251 occurs to ensure that sealing is established or maintained. Further, monitoring one or both the sensors 201, 202 can ensure that excess force that might break the glass plug 18 is not applied to the glass plug 18 in embodiments where the amount of force can be controlled. Monitoring signals received from the first sensor 201 can detect the presence and condition of hydrostatic loads from surrounding fluid since these hydrostatic loads dominate the response of the first sensor 201. When the feedthrough assembly 200 is part of a wellhead outlet of an oil/gas well, the sensors 201, 202 can be used to detect pressure increases and set an alarm indicating that seals have been breached in the well.

Figure 3:
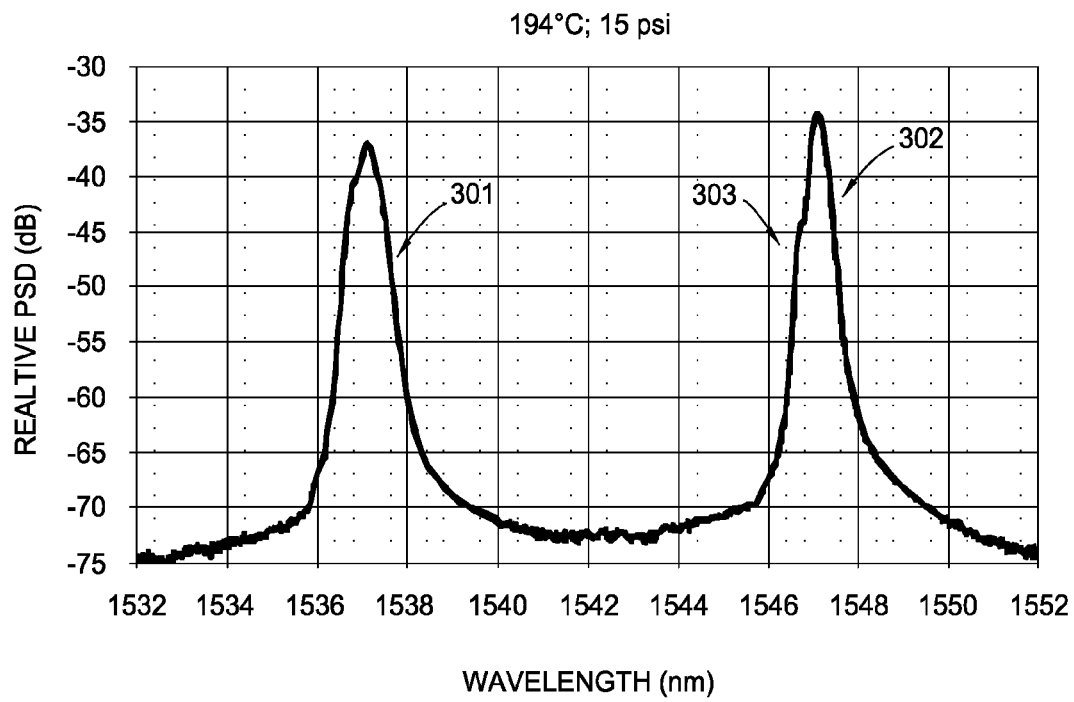
FIGS. 3-5 illustrate graphs of signals received from the diagnostic sensors where the feedthrough assembly is at a fixed temperature and different pressure for each graph.
Figure 4:
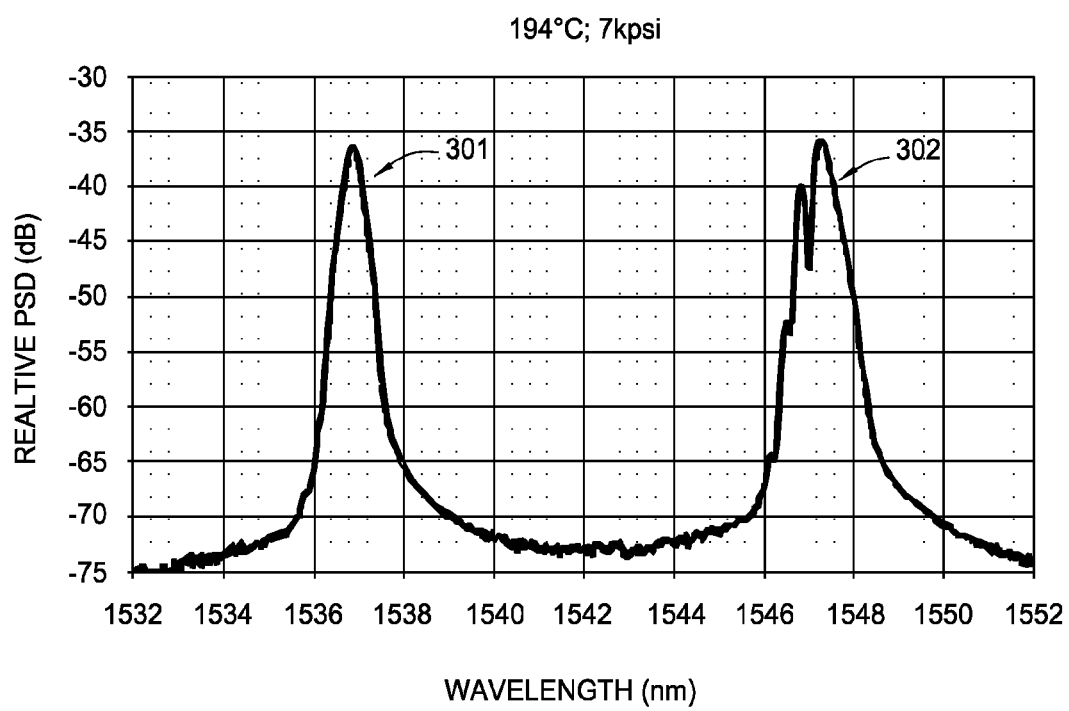
Figure 5:
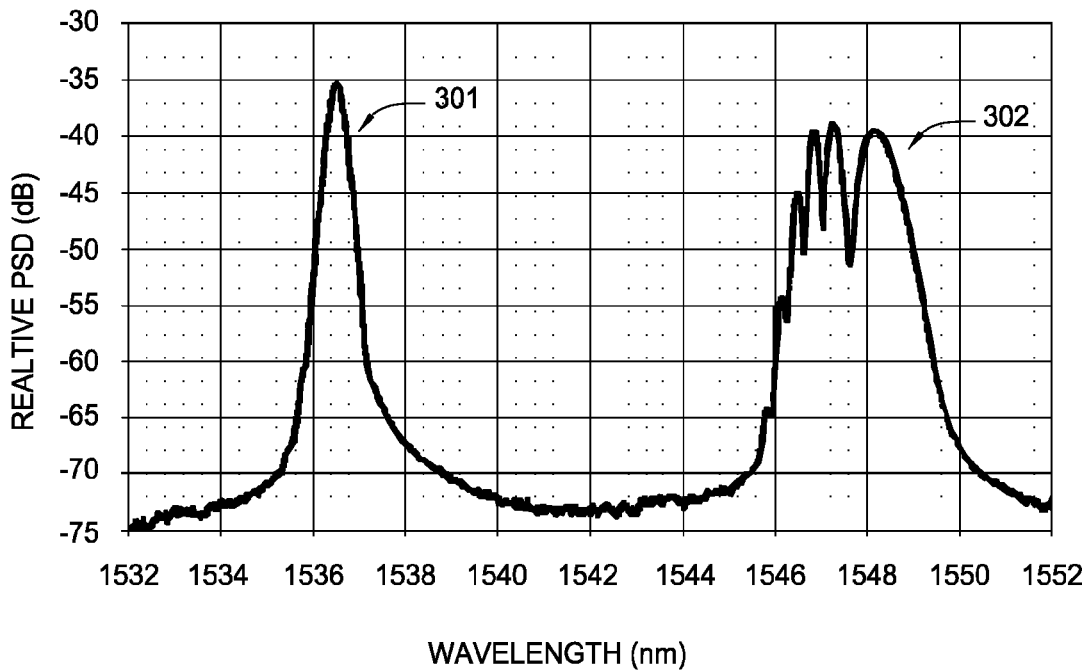

FIGS. 3-5 illustrate graphs of signals received from the diagnostic sensors 201, 202 where the feedthrough assembly 200 is at a fixed temperature but has different pressures introduced at end 224 for each graph. In all of the graphs herein, first sensor responses 301 correspond to signals received from the first sensor 201 while second sensor responses 302 correspond to signals received from the second sensor 202. In FIG. 3, an initial distortion or spreading of the second sensor response 302 visible specifically as a spectral chirp 303, providing positive feedback that preload of the glass plug 18 at the tapered surface 250 against the seat 251 has been established.

As visible in FIGS. 4 and 5, this distortion in the second sensor responses 302 grows relative to pressure due to non-uniform seal loads. However, the first sensor responses 301 show little change as pressure increases since uniform hydrostatic pressure dominates the first sensor 201. Additionally, the first sensor responses 301 provide an indication of a thermo-mechanical state of the housing of the feedthrough assembly 200 and a small pressure driven change in the preload of the plug 232.

Figure 6:
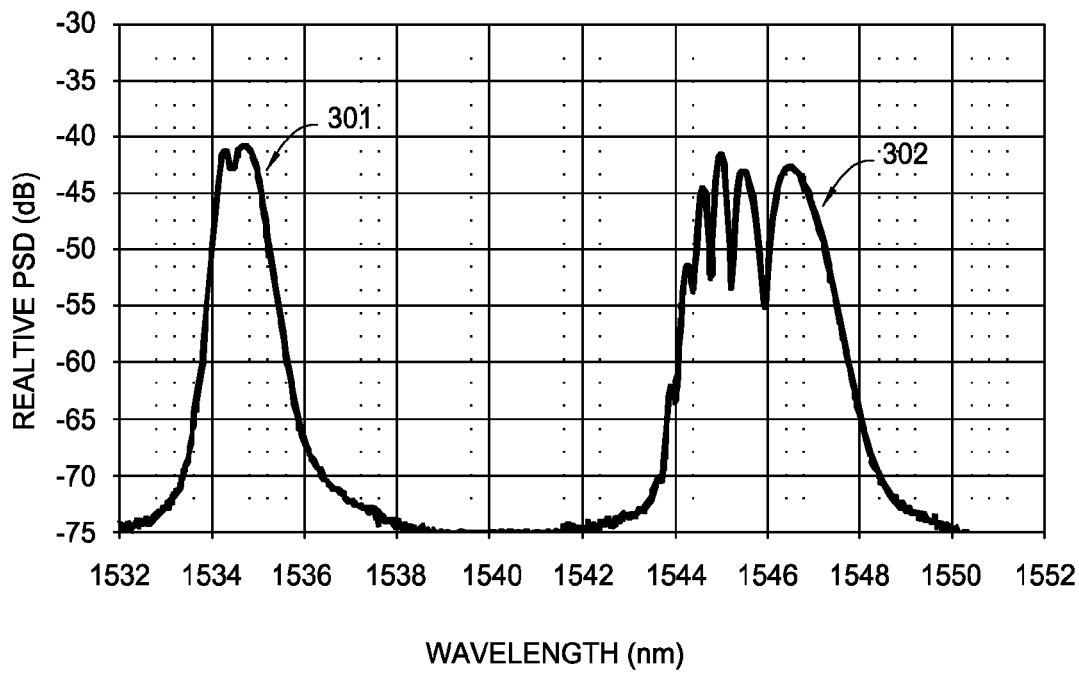
FIGS. 6-8 illustrate graphs of signals received from the diagnostic sensors where the feedthrough assembly is at a fixed pressure and different temperature for each graph.
Figure 7:
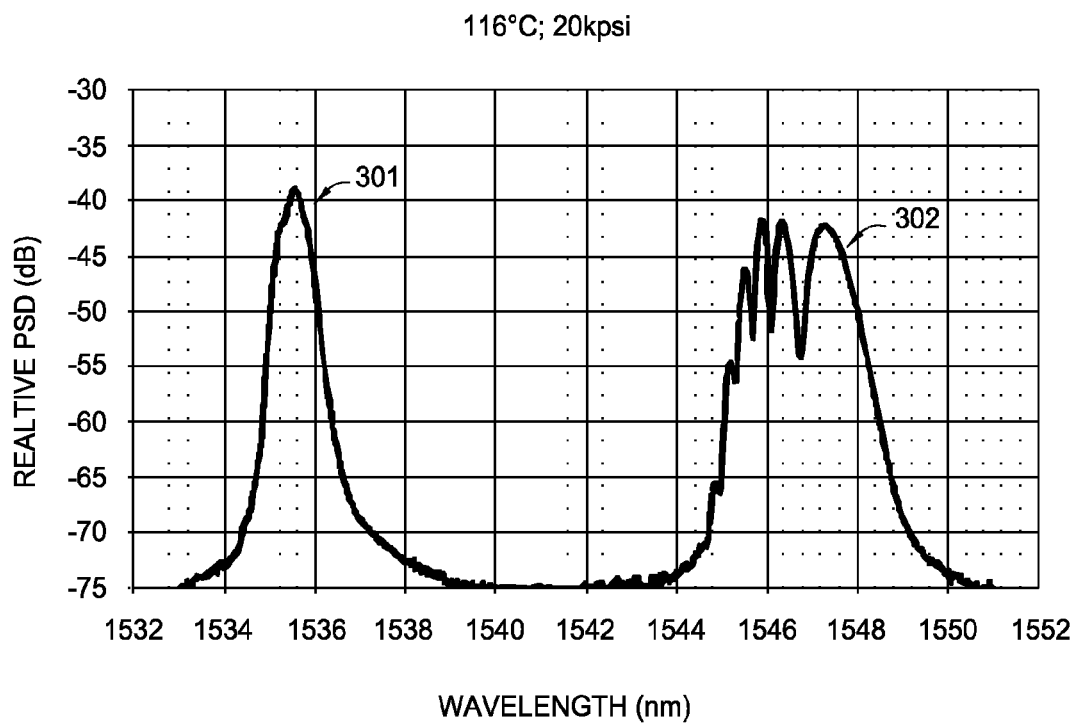
Figure 8:
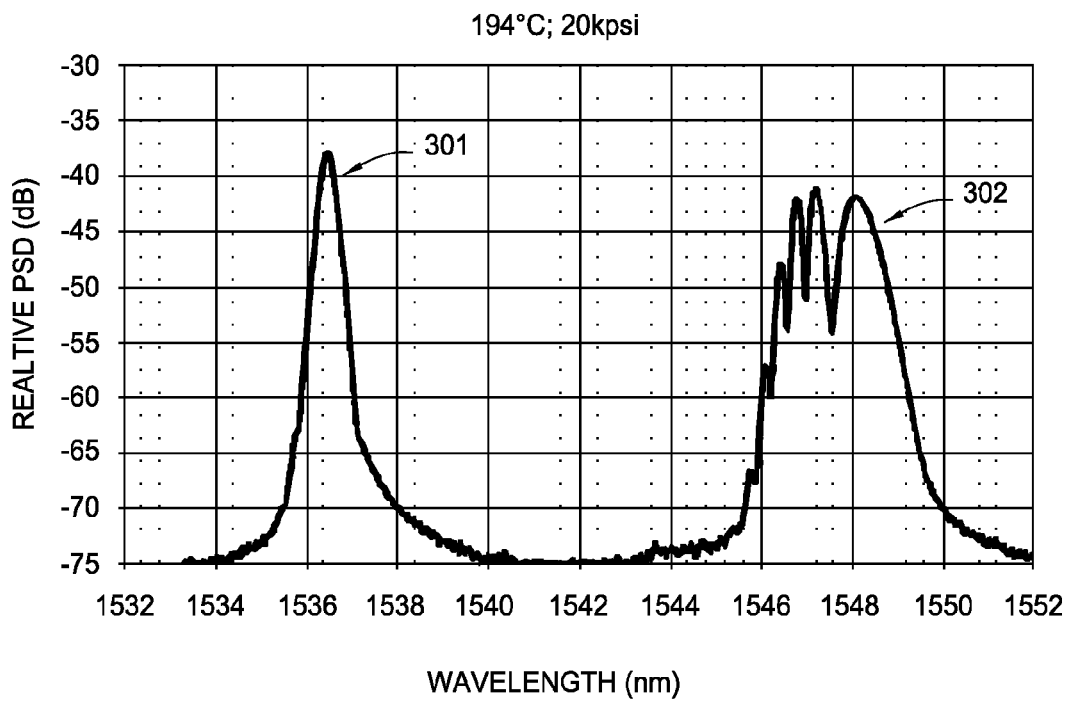

FIGS. 6-8 show graphs of signals received from the diagnostic sensors 201, 202 where the feedthrough assembly 200 is at a fixed pressure but is at a different temperature for each graph. The graphs show that as temperature increases both of the responses 301, 302 shift in wavelength relative to the temperature increase in the same direction. For example, the peak at approximately 1534.5 nanometers (nm) in the first responses 301 at 25° C. shifts to approximately 1536.5 nm at 194° C. Other than small changes from temperature driven changes in the preloads, shapes of the responses 301, 302 do not change with temperature changes.

With reference to FIG. 1, pressure entering the first end 22 of the passageway 16 may be significantly higher than the pressure entering the second end 24 of the passageway 16 in some applications. In this instance, if the higher pressure from the first end 22 exceeds a threshold value, then the seals formed by the seated tapered surface 50 of the glass plug 18 and/or the centering element 42 may be unseated. Accordingly, non-epoxy feedthrough assemblies in some embodiments can be adapted to seal against pressure from either side of a glass plug.

A Bi-Directional Seal Assembley

Figure 9:
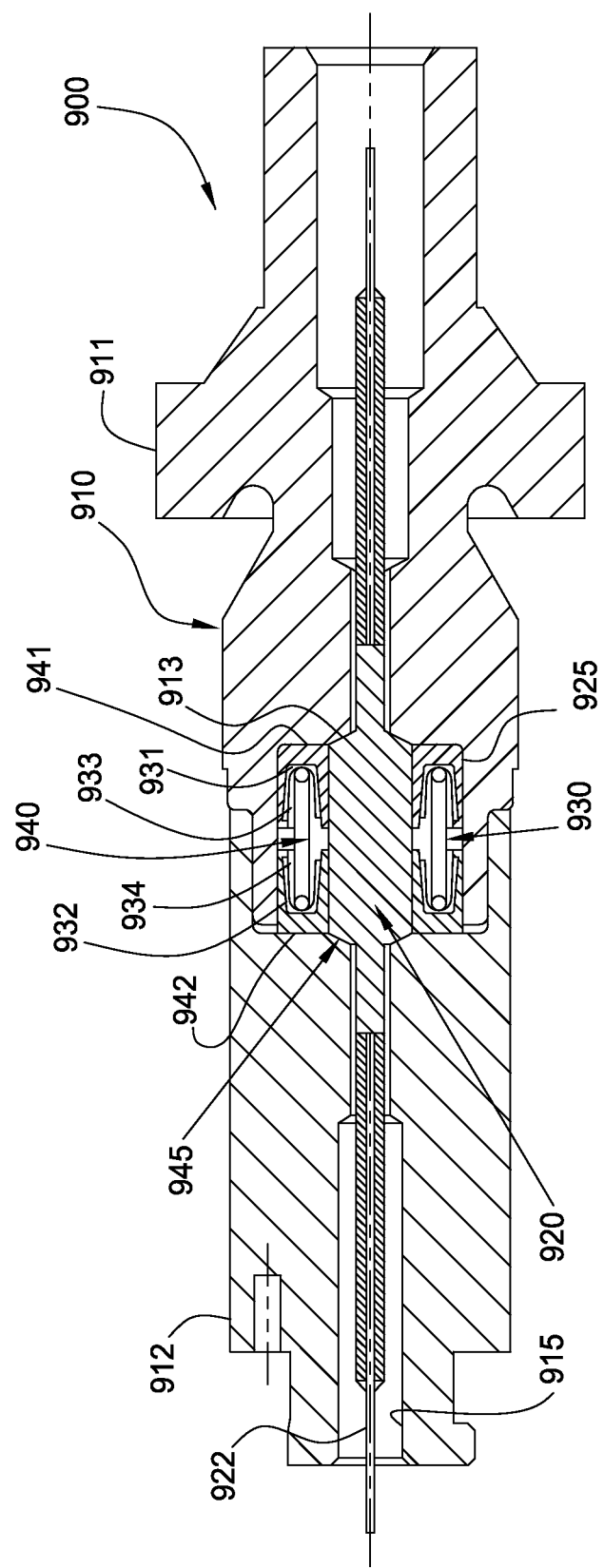
FIG. 9 illustrates a cross section view of an optical waveguide feedthrough assembly that provides bi-directional seal performance.

FIG. 9 shows an exemplary feedthrough assembly 900 having a bi-directional pressurized seal assembly 930. A cone shaped glass plug 920 is disposed in a recess 925 of a feedthrough housing 910 formed by two body sections 911, 912. The body sections 911, 912 can be coupled together using a weld or various other coupling configurations. A bore 915 sized to accommodate portions of an optical waveguide element 922 on either side of the glass plug 920 extends through the feedthrough housing 910. A tapered seat 913 can be formed on each body section 911, 912 for receiving the glass plug 920. Similar to the embodiment shown in FIG. 1, a gasket member 945 such as an annular gold foil can be disposed between the glass plug 920 and the tapered seats 913 of the body sections 911, 912. The symmetrical configuration of tapered seats 913 in sections 911, 912 creates the primary bidirectional seal design.

In one embodiment, a back-up bi-directional seal assembly 930 is disposed in the recess 925 to provide an additional seal against any leakage from either body section 911, 912. The seal assembly 930 includes two cup-shaped, annular sealing elements 931, 932 and a positioning device 940 to maintain the sealing elements 931, 932 in their respective seal seats 941, 942. The sealing elements 931, 932 are positioned such that their interior portions are opposed to each other and the positioning device 940 may be disposed in the interior portions of the sealing elements 931, 932. The positioning device 940 may comprise a preloaded spring to bias the sealing elements 931, 932 against their respective seal seats 941, 942, or against the body sections 911, 912. In one embodiment, the sealing elements 931, 932 are made of an elastomeric material. The sealing elements 931, 932 can also comprise other suitable flexible materials capable of withstanding high temperature and high pressure.

In operation, if fluid leaks through the tapered surfaces between the glass plug 920 and the first body section 911, then the fluid pressure forces the glass plug 920 against the tapered seat in the body section 912 to activate the reverse direction seal. The fluid pressure will also act against the second sealing element 932, which is biased against the second body section 912. Particularly, the fluid pressure acts on the interior portion of the second sealing element 932 and urges sealing lips 934 of the second sealing element 932 outward, thereby sealing off any fluid path between the second sealing element 932 and the glass plug 920 and between the second sealing element 932 and the body section 911. In this manner, the leaked fluid is prevented from entering the bore of the second body section 912 because of redundant seals.

Similarly, if fluid leaks through the tapered surfaces between the glass plug 920 and the second body section 912, then the fluid pressure forces the glass plug 920 against the tapered seat 913 in body section 911. The fluid pressure will also act against the first sealing element 931 biased against the first body section 911. In this respect, the fluid pressure causes sealing lips 933 of the first sealing element 931 to sealingly engage the glass plug 920 and the body section 911. Thus, the leaked fluid is prevented from entering the of bore of the first body section 911 because of redundant seals.

Feedthrough Assembly with Compression Bushing

Figure 10:
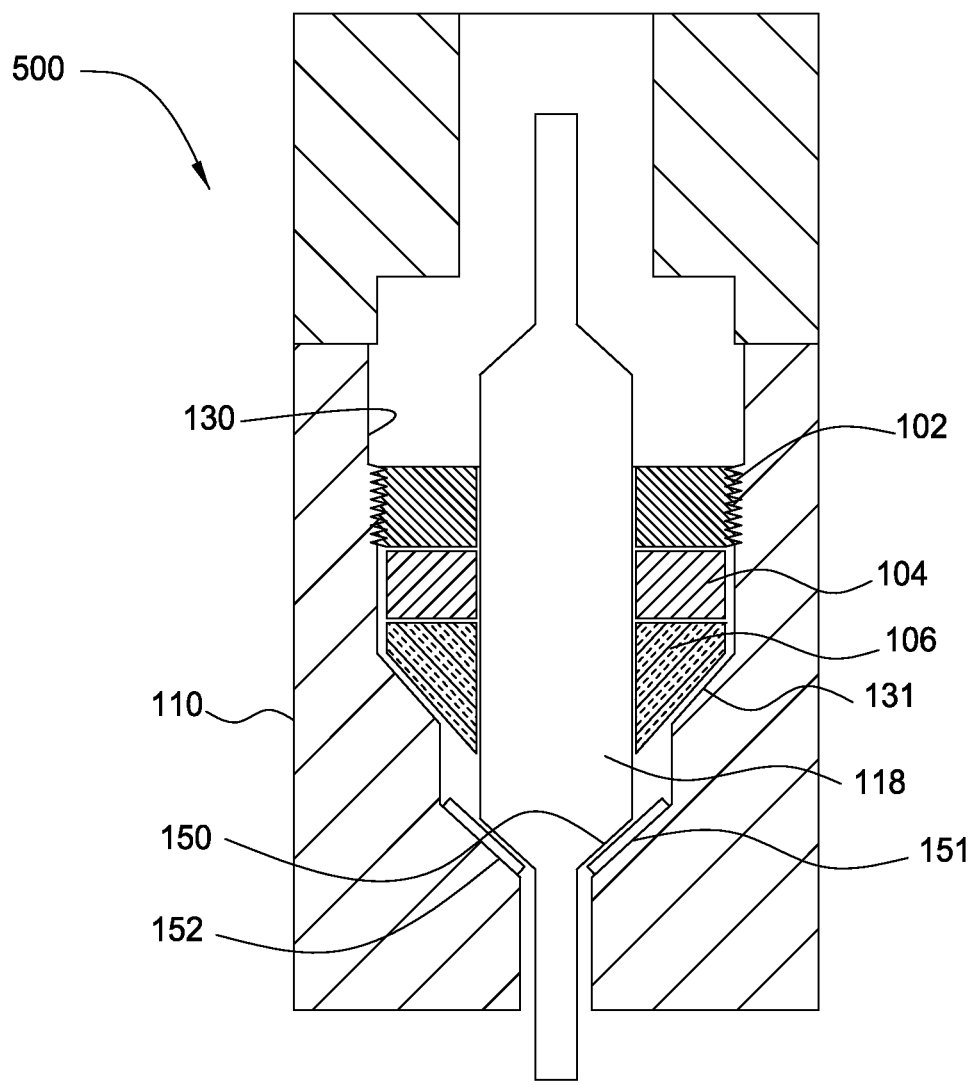
FIG. 10 illustrates a cross sectional view of an optical waveguide feedthrough assembly that includes a compression seal element.

FIG. 10 illustrates a cross sectional view of an optical waveguide feedthrough assembly 500 that includes a housing 110, an externally threaded bushing 102, a compression driver bushing 104, a compression seal element 106, and a glass plug 118 portion of an optical waveguide element that sealingly passes through the housing 110. The bushings 102, 104 and the seal element 106 are disposed adjacent to one another in a recess 130 in the housing 110 and encircle a portion of the glass plug 118. Specifically, the externally threaded bushing 102 threads into a portion of the recess 130 in the housing 110 defining mating internal threads. The seal element 106 is located next to the driver bushing 104 and proximate an inward tapering cone 131 along the recess 130 in the housing 110.

A seal can be established with the glass plug 118 with respect to the housing 110 by driving the seal element 106 down the cone 131. To establish this seal, rotation of the threaded bushing 102 with respect to the housing 110 displaces the threaded bushing 102 further into the recess 130 due to the threaded engagement between the threaded bushing 102 and the housing 110. The driver bushing 104 in turn moves further into the recess and pushes the sealing element 106 toward the cone 131. One function of the driver bushing 104 includes reducing torque transferred to the seal element 106 from the threaded bushing 102.

Preferably, the glass plug 118 has a cone shaped tapered surface 150 for seating against a complementary tapered seat 151 of the housing 110. The engagement between the tapered surface 150 and the complementary tapered seat 151 can also or alternatively seal off fluid communication through the housing 110 around the glass plug 118 in a redundant manner. A gasket member 152 such as an annular gold foil can be disposed between the tapered surface 150 of the glass plug 118 and the tapered seat 151 of the housing 110 to reduce stress risers.

Figure 11:
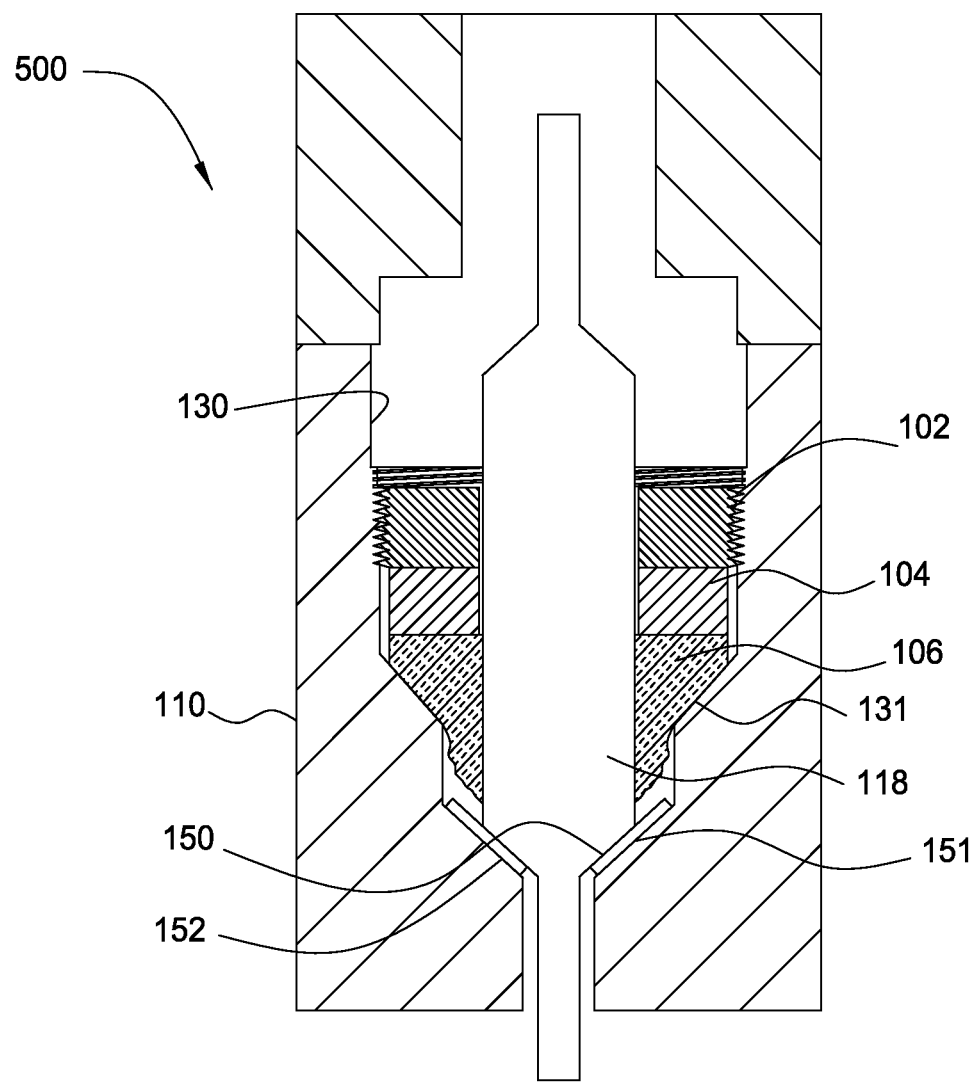
FIG. 11 illustrates the optical waveguide feedthrough assembly shown in FIG. 10 after compression of the compression seal element.

FIG. 11 illustrates the optical waveguide feedthrough assembly 500 after compressing the seal element 106. The seal element 106 packs within an annulus between an exterior of the glass plug 118 and an interior of the housing 110 after being driven down the cone 131. Once packed in the annulus, the seal element 106 provides sealing contact against both the glass plug 118 and the housing 110. Examples of suitable materials for the seal element 106 include TEFLON™, VESPEL™, polyimide, PEEK™, ARLON™, gold or other ductile metals for high temperature applications. During lower temperature usage, element 106 can be nylon, DELRIN™ or metal such as tin or lead. The driving of the seal element 106 can additionally move the glass plug 118 to force the tapered surface 150 to mate with the seat 151. The glass plug 118 is of sufficient diameter and structural integrity that the compression of the seal element 106 around the glass plug does not disturb the optical qualities thereof. The feedthrough assembly 500 is capable of sealing the glass plug 118 with respect to the housing 110 regardless of which side of the housing 110 is exposed to a higher pressure.

An Additional Exemplary Feedthrough Assembly

Figure 12:
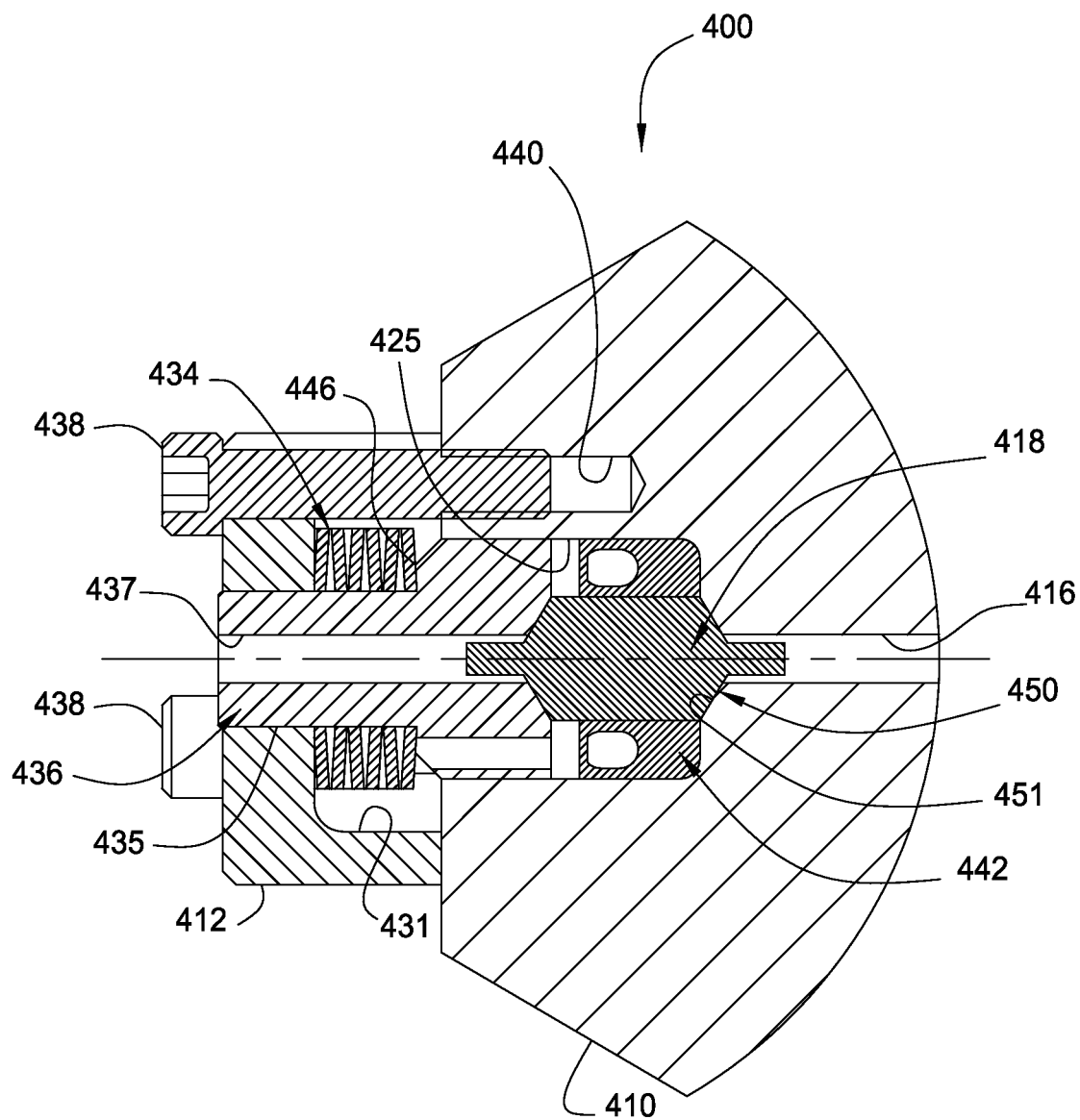
FIG. 12 illustrates a cross section view of another optical waveguide feedthrough assembly.

FIG. 12 shows a cross-section view of a feedthrough assembly 400 that includes a feedthrough housing 410 for retaining a glass plug 418. A recess 425 is formed in one end of the housing 410 to receive the glass plug 418. Preferably, the recess 425 has a corresponding tapered seat 451 for receiving a cone shaped tapered surface 450 of the glass plug 418. The glass plug 418 is preferably biased against the tapered seat 451 that is located along a bore 416 that connects to the recess 425 and provides a passageway through the housing 410.

In one embodiment, a fitting 436 having an axial bore 437 extending therethrough is disposed between the glass plug 418 and a washer cap 412. One end of the fitting 436 has a surface that mates with the glass plug 418 and an outer diameter that is about the same size as the inner diameter of the recess 425. In this respect, the fitting 436 assists with supporting the glass plug 418 in the recess 425. The other end of the fitting 436 has a neck 435 that connects to the washer cap 412. Particularly, a portion of the neck 435 fits in a hole of the washer cap 412. The washer cap 412 may be attached to the feedthrough housing 410 by any manner known to a person of ordinary skill in the art, such as one or more screws or bolts. For example, bolts 438 (two of three are visible in FIG. 12) may be used to attach the washer cap 412 to the feedthrough housing 410 via three screw holes 440 (only one is visible in FIG. 12) formed through the washer cap 412 and into the feedthrough housing 410.

The inner portion of the washer cap 412 facing the feedthrough housing 410 has a cavity 431 for retaining a preload member such as a spring. In one example, the preload member is a Belleville washer stack 434. The washer stack 434 may be disposed on the neck 435 of the fitting 436 and between the washer cap 412 and an outward shoulder 446 formed by a reduced diameter of the neck 435 of the fitting 436. In this manner, the washer stack 434 may exert a preloading force on the glass plug 418 to maintain a seal between the glass plug 418 and the tapered seat 451 of the feedthrough housing 410. Similar to the embodiments described above, a gasket member such as an annular gold foil (not shown) can be disposed between the glass plug 418 and the tapered seats 451 and/or the glass plug 418 and the fitting 436.

The feedthrough assembly 400 may further include a centering element 442 to act as a back-up seal. The centering element 442 comprises an elastomeric sealing component that is disposed between the glass plug 418 and the feedthrough housing 410. A pressure differential across the glass plug 418 advantageously causes the centering element 442 to deform and press against the wall of the recess 425 and the wall of the glass plug 418, thereby creating a pressure energized seal. Although the centering element 442 is described as providing a back up seal, the centering element 442 may be used independently to seal off the bore 416 of the feedthrough housing 410.

The invention heretofore can be used and has specific utility in applications within the oil and gas industry. Further, it is within the scope of the invention that other commercial embodiments/uses exist with one such universal sealing arrangement shown in the figures and adaptable for use in (by way of example and not limitation) industrial, chemical, energy, nuclear, structural, etc. While the foregoing is directed to preferred embodiments of the invention, other and further embodiments of the invention may be devised without departing from the basic scope thereof, and the scope thereof is determined by the claims that follow.

What is claimed is:

1. An optical waveguide feedthrough assembly, comprising:
   a housing having a bore therethrough with an inward tapering conical surface located along a length of the bore;
   an optical waveguide element having a plug portion in optical communication with two optical waveguide portions extending from each end of the plug portion;
   a compression seal element disposed around the plug portion within the bore proximate the conical surface; and
   an externally threaded bushing mated with an internal threaded portion of the bore of the housing, wherein the bushing is rotatable with respect to the housing to drive the seal element down the conical surface and pack an annulus between the housing and the plug portion.

2. The assembly of claim 1, further comprising a compression driver bushing disposed between the seal element and the threaded bushing.

3. The assembly of claim 1, wherein the plug portion comprises a tapered surface for mating with a complementary tapered seat disposed in the housing located along a length of the bore.

4. The assembly of claim 3, further comprising an annular gasket member disposed between the complementary tapered seat and the tapered surface of the plug portion.

5. The assembly of claim 3, further comprising a gold film disposed between the complementary tapered seat and the tapered surface of the plug portion.

6. The assembly of claim 1, wherein the plug portion comprises a large diameter optical waveguide having an outer diameter of at least 3 mm.

7. The assembly of claim 1, wherein the plug portion has a greater outer diameter than the two optical waveguide portions extending from each end of the plug portion.

8. The assembly of claim 1, wherein the plug portion has a core and a cladding surrounding the core.

9. The assembly of claim 1, wherein the two optical waveguide portions are spliced to each end of the plug portion.

* * * * *